June 19, 1956  V. K. EDER  2,750,817
DRILL
Filed Aug. 22, 1952
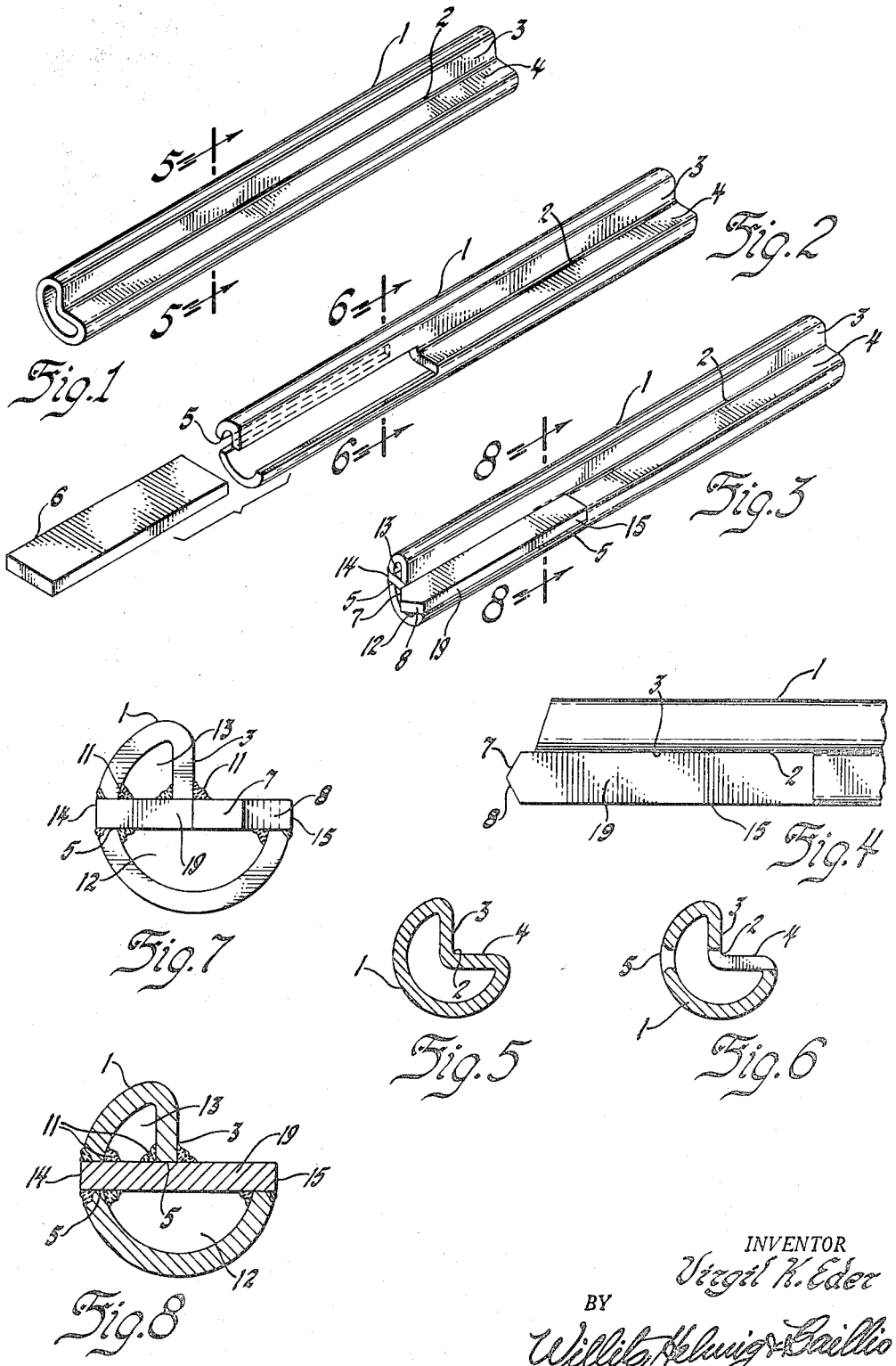
INVENTOR
Virgil K. Eder
BY
Willis, Helwig & Gaillio
ATTORNEYS United States Patent Office 2,750,817
Patented June 19, 1956

2,750,817

DRILL

Virgil K. Eder, Indianapolis, Ind., assignor to General Motors Corporation, Detroit, Mich., a corporation of Delaware Application August 22, 1952, Serial No. 305,840

2 Claims. (Cl. 77—68)

This invention relates to drills. More particularly, it relates to drills having inserted cutters.

While inserted cutter drills have long been used for drilling extremely hard materials and for high-speed drilling, such drills are very costly. As a result, the use of drills having extremely hard cutting inserts has been restricted to applications where their use has been absolutely necessary. The high cost of these drills has precluded their use in many applications where they are not absolutely necessary but would permit increased production.

An object of this invention is to produce an economical inserted cutter drill.

A second object is to produce an inserted cutter drill having a coolant passage in the shank thereof.

Referring now to the figures of the drawing:

Fig. 1 is a perspective view of tubular stock which may be used as a shaft member.

Fig. 2 is an exploded perspective view showing the cutter insert and the shaft member after it has been slotted.

Fig. 3 is a perspective view of the drill assembly.

Fig. 4 is a plan view of the drill assembly.

Fig. 5 is a section view through line 5—5 of Fig. 1.

Fig. 6 is a section view through line 6—6 of Fig. 2.

Fig. 7 is an end view of the completed drill showing the details of the cutting edge on the cutter insert.

Fig. 8 is a section view of the completed drill through line 8—8 of Fig. 3.

Referring more particularly to the figures, Fig. 1 shows thin-walled tubular stock material 1 which may be used to form the shaft of the drill. This tubular stock may be of alloy or any suitable metal, although preferably of a high strength metal to better withstand torsional stresses. The use of a high strength metal permits using a thin-walled relatively inexpensive tubing. It may be made either by forming a longitudinal depression 2 in a thin-walled tubular member, as shown in Fig. 1, or by rolling or otherwise forming a sheet or sheets of metal to the desired shape and then joining the edges of the metal. As shown in Fig. 1, the thin-walled tubular shaft member 1 has two flat walls 3 and 4 which lie in substantially the same plane as radii of the tubular member. These walls, however, need not lie in these planes and in fact, may be curved if desired.

Fig. 2 shows the shaft member after a transverse longitudinal cutter receiving slot 5 has been placed at one end thereof. The longitudinal transverse slot 5 extends through the walls of the shaft member as shown in Figs. 2 and 6 and lies substantially in the plane of one radius of the shaft. The cutter insert 6 preferably has a width substantially equal to the diameter of the shaft member 1 to provide bearing surfaces 14 and 15 for receiving the thrust from the cutting edges 7 and 8. The thickness of the cutter insert is dictated by the strength and coolant passage requirements and will therefore vary with the mechanical strength characteristics of the cutting material used. Here it is shown as having approximately the same thickness as that of the tubular walls. The length of the cutter insert should be such than when it is fully inserted in the slot 5, the cutting edges extend beyond the end of the shaft member 1, so that the cutting edge may be sharpened or otherwise shaped without grinding of the shaft member itself. Such construction also permits a better coolant flow to the cutter blade and provides easier cutting chip removal.

The cutter insert 6 is preferably of a hardened cutting material such as tungsten carbide, tantalum carbide, or other carbide material, although any suitable hardened cutting material may be used.

As shown in Figs. 2 and 3, the cutter insert 6 is fitted into the slot 5 of the shaft member 1 and is permanently secured in place by brazing, silver soldering, or welding. The resulting metal fillets 11 aid in strengthening the drill structure internally. The edges of the slot 5 may be beveled to form a space to receive the fillet material.

Figs. 3, 4 and 7 show the completed drill assembly, a cross section of which is shown in Fig. 8. As shown in these figures the cutter insert is permanently secured in the transverse slot with the cutting edges extending beyond the end of the shaft member 1 and having its edges 14 and 15 forming bearing surfaces for receiving the thrust from the cutting edges. The cutting edges 7 and 8 may be formed on the cutter insert after the insert is secured in the shaft member or a cutter insert 19 having the finished cutting edges preformed may be used. The latter method eliminates the necessity for any sharpening or grinding of the cutter insert after it is mounted in the shaft. An additional advantage of this method is that a large number of cutter insert blanks may be stacked together and accurately ground to the desired shape simultaneously and then fitted in the slotted shaft member to complete the drill. Figs. 7 and 8 also show the large coolant passages 12 and 13 which are provided to permit supplying coolant and lubricant along both sides of the cutter insert simultaneously.

The completed drill preferably is electroplated with a metal such as chromium to give a smooth outer surface. In operation, the drill assembly, as shown in Figs. 3 and 4, may be mounted on any conventional drill press or drilling apparatus. It will be seen that the large passages 12 and 13 permit a greater amount of coolant or lubricant to be supplied to the cutting edges to give more efficient cooling and lubrication. The combination of a large coolant supply passage together with a large longitudinal depression in the shaft permits easier lubrication and cutting chip removal.

Obviously, variations in structure may be made which are not specifically disclosed herein. The embodiments described are intended to be illustrative only and the scope of the invention is to be measured solely by the claims.

I claim:

1. A drill comprising a thin-walled tubular member having a cylindrical portion and a portion formed by two flat walls extending the entire length of the tubular member and in planes substantially at 90° to each other whereby the cross-sectional shape of the passage in said tubular member is substantially a three-quarter sector of a circle, a slot at one end of said tubular member in the plane of one of said flat walls, and a flat carbide cutter insert secured in said slot and having cutting edges extending beyond the end of said tubular member, other edges of said flat carbide cutter being substantially flush with the external walls of the tubular member, said carbide cutter insert dividing the passage in the tubular member into two smaller passages.

2. A drill comprising a thin-walled tubular member having a cylindrical portion and a portion formed by two flat walls extending lengthwise of the tubular member and in planes at angles less than 180° to each other whereby the cross-sectional shape of the passage in said tubular member constitutes a sector of a circle greater than one-half the area of the circle, a slot at one end of said tubular member in the plane of one of said flat walls, and a flat cutter insert secured in said slot and having cutting edges extending beyond the end of said tubular member, other edges of said flat cutter being substantially flush with the external walls of the tubular member, said cutter insert dividing the passage in the tubular member into two smaller passages.

References Cited in the file of this patent

UNITED STATES PATENTS

| | | |
|---|---|---|
| 534,009 | Pratt | Feb. 12, 1895 |
| 841,184 | Roeske | Jan. 15, 1907 |
| 1,104,989 | Hanson | July 28, 1914 |
| 2,418,021 | Fleischer | Mar. 25, 1947 |

FOREIGN PATENTS

| | | |
|---|---|---|
| 15,608 | Great Britain | Nov. 5, 1915 |